United States Patent
Zhang et al.

(10) Patent No.: US 8,024,502 B2
(45) Date of Patent: Sep. 20, 2011

(54) KVM EXTENDER SYSTEM AND LOCAL, REMOTE MODULES THEREOF

(75) Inventors: Wen Zhang, Shijr (TW); Jin Qian, Shijr (TW)

(73) Assignee: Aten International Co., Ltd., Taipei (TW)

( * ) Notice: Subject to any disclaimer, the term of this patent is extended or adjusted under 35 U.S.C. 154(b) by 255 days.

(21) Appl. No.: 12/081,632

(22) Filed: Apr. 18, 2008

(65) Prior Publication Data

US 2009/0265491 A1 Oct. 22, 2009

(51) Int. Cl.
*G06F 13/12* (2006.01)
*G06F 13/38* (2006.01)

(52) U.S. Cl. .......................... 710/72; 370/293; 370/502
(58) Field of Classification Search .................. 710/72
See application file for complete search history.

(56) References Cited

U.S. PATENT DOCUMENTS

| | | | |
|---|---|---|---|
| 6,584,519 B1 | 6/2003 | Russell | |
| 7,259,482 B2 * | 8/2007 | Voll et al. | 307/147 |
| 7,346,728 B1 * | 3/2008 | Jackson | 710/313 |
| 7,351,110 B1 * | 4/2008 | Wu | 439/638 |
| 2004/0042547 A1 * | 3/2004 | Coleman | 375/240.01 |
| 2004/0199699 A1 * | 10/2004 | Bobbitt et al. | 710/305 |
| 2005/0235079 A1 * | 10/2005 | Chen | 710/73 |
| 2005/0246433 A1 * | 11/2005 | Carrigan et al. | 709/223 |
| 2006/0198389 A1 * | 9/2006 | Eriokson et al. | 370/466 |
| 2007/0109263 A1 * | 5/2007 | Sim et al. | 345/161 |
| 2008/0114481 A1 * | 5/2008 | Braithwaite et al. | 700/94 |
| 2009/0150580 A1 * | 6/2009 | Wen | 710/72 |
| 2009/0150664 A1 * | 6/2009 | Zhang et al. | 713/153 |
| 2009/0265488 A1 * | 10/2009 | Birger | 710/64 |

* cited by examiner

*Primary Examiner* — Henry Tsai
*Assistant Examiner* — Elias Mamo
(74) *Attorney, Agent, or Firm* — Patterson & Sheridan, LLP

(57) ABSTRACT

Disclosed is a KVM extender system, which includes a first module, comprising a first processor, a first interface, a first Ethernet transceiver and includes a second module, comprising a second processor, a second interface, a second Ethernet transceiver. The KVM extender system transceives first data packet and second data packet transformed from first mass data of a first mass storage, second mass data of a second mass storage, keyboard/mouse data, audio/sound data with a cable therebetween. The first data packet and the second data packet transceived between the first and second Ethernet transceivers are controlled by a half duplex communication executed by two wires of the cable. Moreover, the first module further comprises a third interface to transceive third mass data from the computer coupled therewith. The third mass data is also transformed into third data packet to be transceived with the first and second data packets.

21 Claims, 5 Drawing Sheets

KVM EXTENDER SYSTEM AND LOCAL, REMOTE MODULES THEREOF

BACKGROUND OF TOTE INVENTION

1. Field of the Invention

The present invention generally relates to a KVM extender system, and more particularly to a KVM extender system transceiving data packets, audio signals and video signal with a cable therebetween.

2. Description of Prior Art

A KVM extender system can allow a console user to access a computer coupled therewith for a remote control solution with a longer communication distance. When the console user accesses the computer, the keyboard/video/mouse control function to the computer is essential and the only purpose of the KVM extender in general. However, the console user may need to operate the computer remotely and download some operation data from the computer to the console. Furthermore, the console user may also need to upload some data to the computer, such as, execution of installing software program, updating operation system, backing up operation data or etc. A storage function for the KVM extender becomes a necessity of aforesaid operations.

However, the present KVM extenders do not support the storage function for the console user. Moreover, a general USB extender which extends transmission length of cable in HUB linking only extends the downstream ports, such as, disclosed in U.S. Pat. No. 6,584,519. Such USB extender only considers USB data transmission. The keyboard, mouse, audio and sound data transmissions are not included in its consideration, not to mention complicated video transmission which is important in a KVM extender system. The KVM extender system includes two extenders each utilizing a RS485 transceiver and a UART connected thereto for transceiving signals. Furthermore, another kind of USB extender which extends transmission length of cable in RS485 UART linking which the max baud rate is not more than 1 M bps generally and limits the speed of operating storage.

SUMMARY OF THE INVENTION

Consequently, there is a need to develop a KVM extender system, transceiving data packets and video signal fleetly with a cable therebetween for solving drawbacks of prior arts.

An objective of the present invention is to provide a KVM extender system capable of transceiving data packets and video signal fleetly with a cable therebetween.

Another objective of the present invention is to provide a KVM extender system supporting storage function more than keyboard, mouse and video console control.

The KVM extender system of the present invention comprises a first module and a second module. The first module comprises a first processor, a first interface and a first Ethernet transceiver. The second module comprises a second processor, a second interface and a second Ethernet transceiver. The first processor transforms first mass data into at least one first data packet and transforms at least one second packet into second mass data. The first interface transceives the first mass data from a first mass storage to the first processor and transceives the second mass data from the first processor to the first mass storage. The first Ethernet transceiver transceives the second data packet from a cable to the first processor and transceives the first data packet from the first processor to the cable.

The second processor transforms the second mass data into the second data packet and transforms the first data packet into the first mass data. The second interface transceives the second mass data from a second mass storage to the second processor and transceives the first mass data from the second processor to the second mass storage. The second Ethernet transceiver transceives the second data packet from the second processor to the cable and transceives the first data packet from the cable to the second processor.

The first module further comprises a third interface for transceiving third mass data from a computer to the first processor and transceives the first mass data or the second mass data from the first processor to the computer, wherein the first interface transceives the third mass data from the first processor to the first mass storage. Moreover, the first processor transforms the third mass data from the computer into at least one third data packet. The first Ethernet transceiver transceives the third data packet from the first processor to the cable. The second Ethernet transceiver transceives the third data packet from the cable to the second processor. The second processor transforms the third data packet into the third mass data and the second interface transceives the third mass data to the second mass storage.

The first module further comprises a differential circuit for transmitting a video signal to the second module and the second module further comprises a de-differential circuit for receiving the video signal from the differential circuit of the first module through the cable.

DETAILED DESCRIPTION OF THE INVENTION

Figure 1:
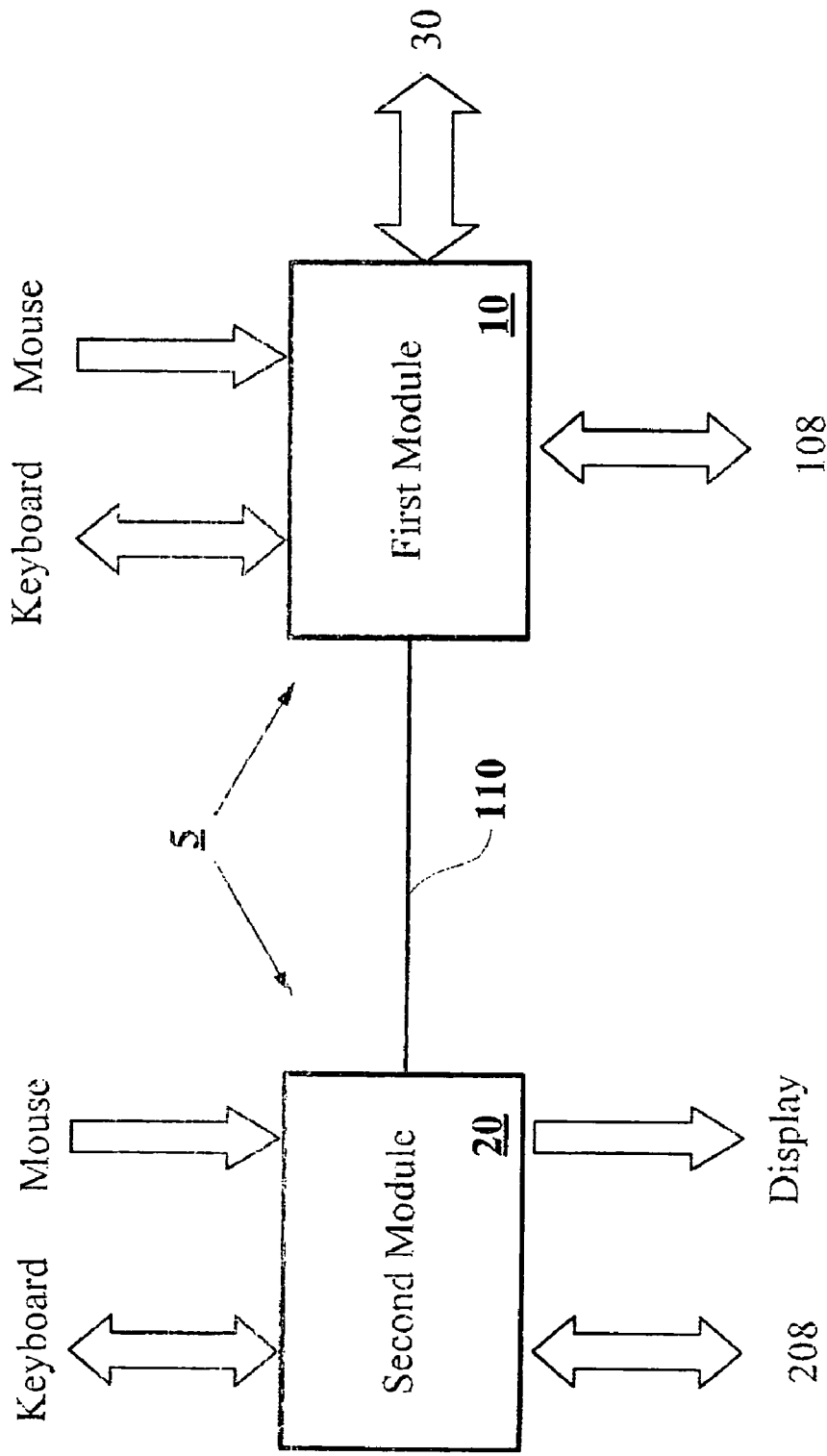
FIG. 1 depicts a simple diagram of a KVM extender system of the present invention.

Please refer to FIG. 1, which depicts a simple diagram of a KVM extender system 5 of the present invention. The KVM extender system 5 comprises a first module 10 (local module) and a second module 20 (remote module). The first module 10 is coupled with a computer 30. The second module 20 is coupled with a keyboard, a mouse and a display of a console. The first module 10 and the second module 20 are connected with each other by at least one cable 110, such as CAT5 and the like cable. Furthermore, the first module 10 can be coupled with a first mass storage 108 through a first interface (not shown) and the second module 20 can be coupled with a second mass storage 208 through a second interface (not shown). When the console user who is beside the second module 20 operates the computer 30 coupled therewith, mass data can be transformed into data packets and transceived among the computer 30, the first mass storage 108 and the second mass storage 208. Furthermore, keyboard data, mouse data, audio data and sound data are all transformed into data packets and transceived between the first module 10 and the second module 20 through the cable 110 as well as the mass data. Moreover, video data from the computer 30 is also transmitted through the cable 110 in the form of differential signal. In one embodiment, mass storage data are transmitted between any two of the first mass storage 108, the second mass storage 208 and the computer 30 via the KVM extender system 5.

Figure 2:
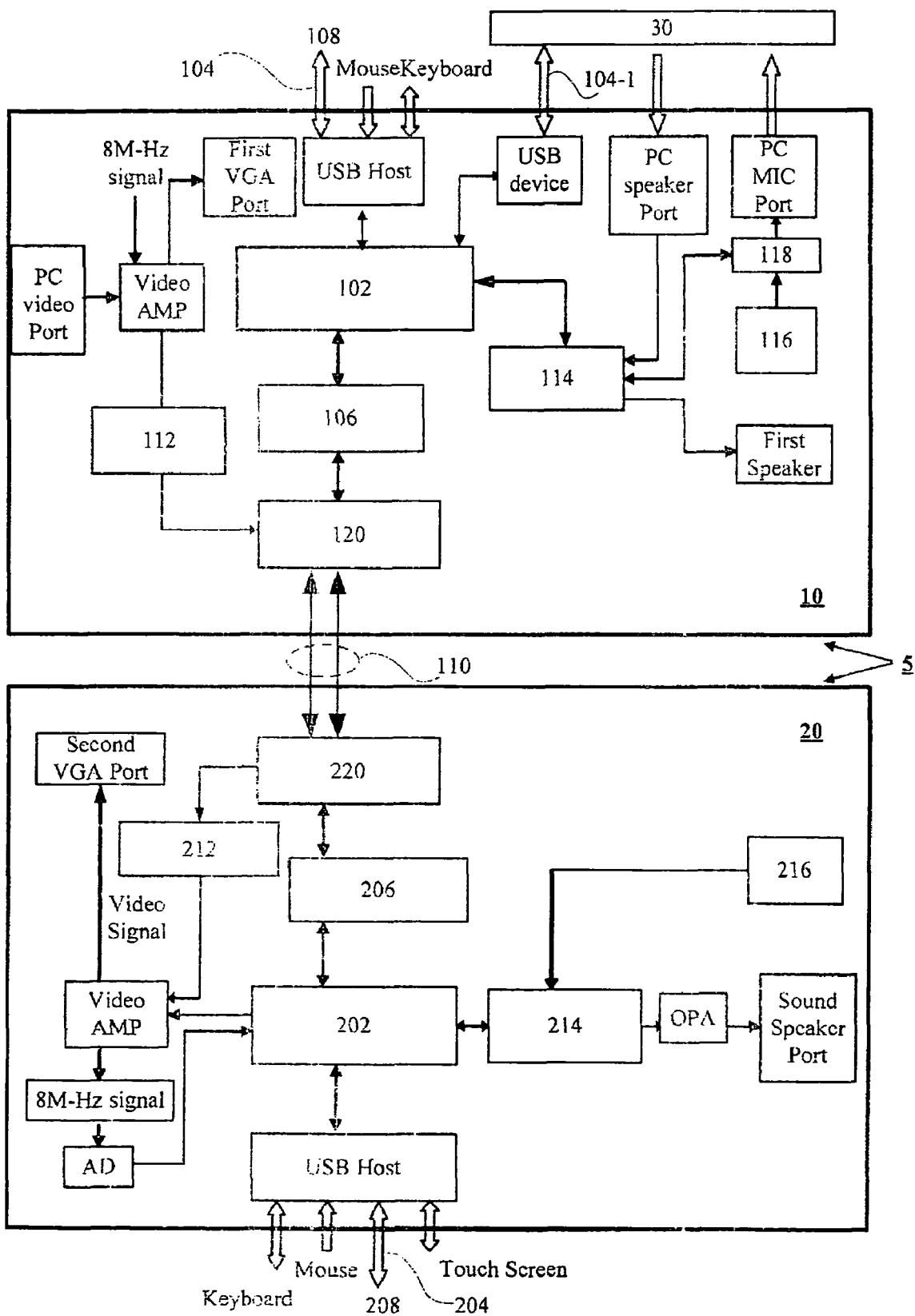
FIG. 2 depicts a detail diagram of a KVM extender system of the present invention.

Please refer to FIG. 2, which depicts a detail diagram of a KVM extender system 5 shown in FIG. 1 according to the present invention. The first module 10 comprises a first processor 102, a first interface 104, a first Ethernet transceiver 106, a differential circuit 112, a first audio converter 114, a first microphone connector 116 and a switch 118. The first module 10 is coupled with the computer 30 with a third interface 104-1. The first module 10 further comprises a PC speaker port, a PC MIC port and a PC video port to connect the corresponding ports of the computer 30. Furthermore, the first module 10 comprises a USB Host and a first VGA port to correspondingly couple with a keyboard, a mouse and a display of a local console which is beside the first module 10. Moreover, the first module 10 comprises a video amp for amplifying video signal before the differential circuit 112 transfers the video signal into the differential video signal. Meanwhile, an 8 M-Hz signal for measuring length of a cable 110 is also transmitted.

The second module 20 comprises a second processor 202, a second interface 204, a second Ethernet transceiver 206, a de-differential circuit 212, a second audio converter 214 and a second microphone connector 216. The second module 20 comprises a USB Host and a second VGA port to correspondingly couple with a keyboard, a mouse and a display or a console which is beside the second module 20. The second module 20 further comprises a sound speaker port, a second microphone connector 216 to connect the corresponding ports of the console which is beside the second module 20. Moreover, the second module 20 comprises a video amp for amplifying the video signal after the de-differential circuit 212 transfers the differential video signal received from a connector 220. Meanwhile, the 8 M-Hz signal is received and the length of the cable 110 is measured for compensating the decay of the video signal.

The first module 10 can be coupled with a first mass storage 108. The second module 20 can be coupled with a second mass storage 208. The first module 10 and the second module 20 are coupled with respective connectors 120 and 220 (such as RJ-45 connector) by the cable 110 (more detail later) to transceive first mass data from the first module 10 to the second module 20 and transceive second mass data from the second module 20 to the first module 10. The first processor 102 transforms first mass data from the first mass storage 108 into the first data packet and transforms the second packet into second mass data. The first interface 104 transceives the first mass data from the first mass storage 108 to the first processor 102 and transceives the second mass data from the first processor 102 to the first mass storage 108. She first Ethernet transceiver 106 transceives the second data packet from the cable 110 to the first processor 102 and transceives the first data packet from the first processor 102 to the cable 110.

Meanwhile, the second processor 202 transforms the second mass data from the second mass storage 208 into the second data packet and transforms the first data packet into the first mass data. The second interface 204 transceives the second mass data from the second mass storage 208 to the second processor 202 and transceives the first mass data from the second processor 202 to the second mass storage 208. The second Ethernet transceiver 206 transceives the second data packet from the second processor 202 to the cable 110 and transceives the first data packet from the cable 110 to the second processor 202.

Moreover, the first processor 102 transforms the third mass data from the computer 30 into at least one third data packet. The first Ethernet transceiver 106 transceives the third data packet from the first processor 102 to the cable 110. The second Ethernet transceiver 206 transceives the third data packet from the cable 110 to the second processor 202. The second processor 202 transforms the third data packet into the third mass data and the second interface 204 transceives the third mass data to the second mass storage 208. In one embodiment, the second processor 202 transforms the fourth mass data from the second mass storage 208 into at least one fourth data packet. The second Ethernet transceiver 206 transceives the fourth data packet from the second processor 202 to the cable 110. The first Ethernet transceiver 106 transceives the fourth data packet from the cable 110 to the first processor 102. The first processor 102 transforms the fourth data packet into the fourth mass data and the first interface 104 transceives the fourth mass data to the computer 30. In another embodiment, the first processor 102 routes data flow paths between the first mass storage 108 and the computer 30.

Therefore, the first, second, third and fourth mass data can be transformed into data packets and transceived among the computer 30, the first mass storage 108 and the second mass storage 208 according to commands from the console or the local console. Furthermore, the keyboard data, the mouse data, the audio data and the sound data are all transformed into data packets and transceived between the first module 10 and the second module 20 through the cable 110 as well as the first, second, third and fourth mass data. In the mean time, the video signal from the computer 30 is also transmitted by the differential circuit 112 through the cable 110 and then, received by the de-differential circuit 212 of the second module 20 in a differential form.

Significantly, the user can employ the local console to control the computer 30 through the first module 10 or can employ the console to access the computer 30 through the second module 20 and the first module 10, similarly. Either of aforesaid ways can allow the user to transform the first, second, third and fourth mass data into data packets and transceive the first, second, third and fourth mass data among the computer 30, the first mass storage 108 and the second mass storage 208. The first audio converter 114 converts audio signal from the computer 30 into audio data and vice versa. The second audio converter 214 converts the audio data into the audio signal and vice versa. Moreover, the first processor 102 transforms the audio data into the first data packet and the second processor 202 transforms the first data packet into the audio data. The first audio converter 114 and second audio converter 214 are also employed for processing a first sound signal from the local console and a second sound signal from the console. The first microphone connector 116 can receive the first sound signal from the local console and the second microphone connector 216 can receive the second sound signal from the console. The switch 118 of the first module 10 can select the first sound signal or the second sound signal to be inputted to the computer 30 according to commands of the user at the local console or the at the console.

Figure 3:
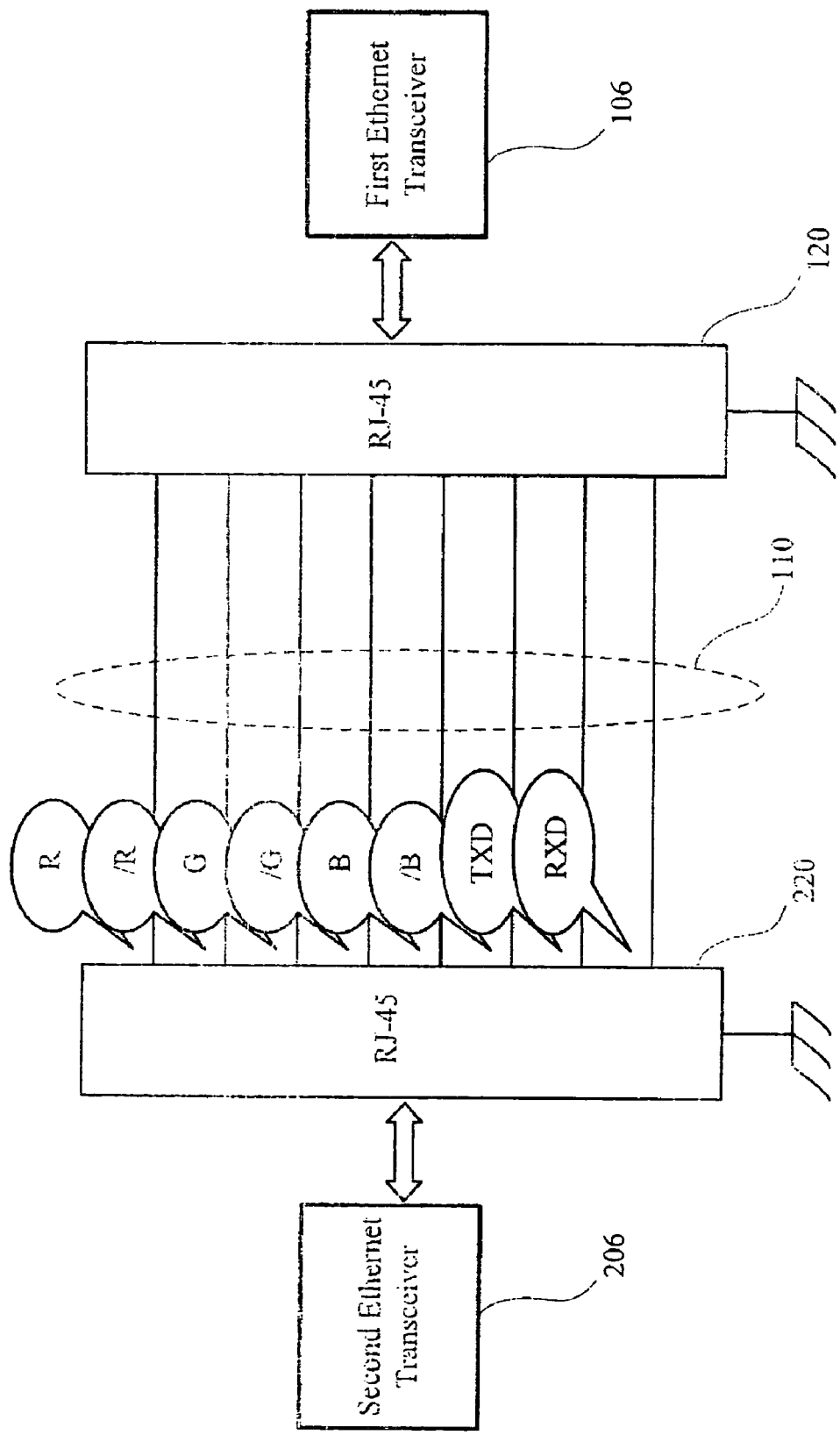
FIG. 3 depicts a diagram of a cable employed for transceiving data packets between first and second modules of the KVM extender system according to the present invention.

Please refer to FIG. 2 and FIG. 3, which depicts a diagram of a cable employed for transceiving data packets between first and second modules of the KVM extender system according to the present invention. The cable 110 can be a special CAT-5 cable with single end characteristic for connecting the RJ-45 connectors 120 and 220 for example. As aforementioned, the first Ethernet transceiver 106 and the second Ethernet transceiver 206 transceive the first, second, third and fourth data packets transformed from the first, second, third and fourth mass data between the first module 10 and second module 20. Meanwhile, the data packets transformed from the keyboard data, the mouse data, the audio data and the sound data are also transceived by the first Ethernet transceiver 106 and the second Ethernet transceiver 206 through two wires, which are named TXD and RXD of the cable 110 shown in FIG. 3. As shown in FIG. 2, the differential circuit 112 transmits Red, Green and Blue components of the video signal to six wires (R, /R, G, /G, B, /B) of the cable 110. The de-differential circuit 212 receives the Red, Green and Blue components of the video signal from the six wires of the cable 110.

The two wires for transmitting differential R and R/ is a first pair of twist wires. The two wires for transmitting differential G and G/ is a second pair of twist wires. The two wires for transmitting differential B and B/ is a third pair of twist wires. The two wires for transmitting keyboard, mouse, audio, sound and mass data is a fourth pair of twist wires. H and V sync signals may be combined with any two sets of R/R, G/G and B/B. The 8 M-Hz signal may be combined with the other sets of R/R, G/G and B/B.

Figure 4:
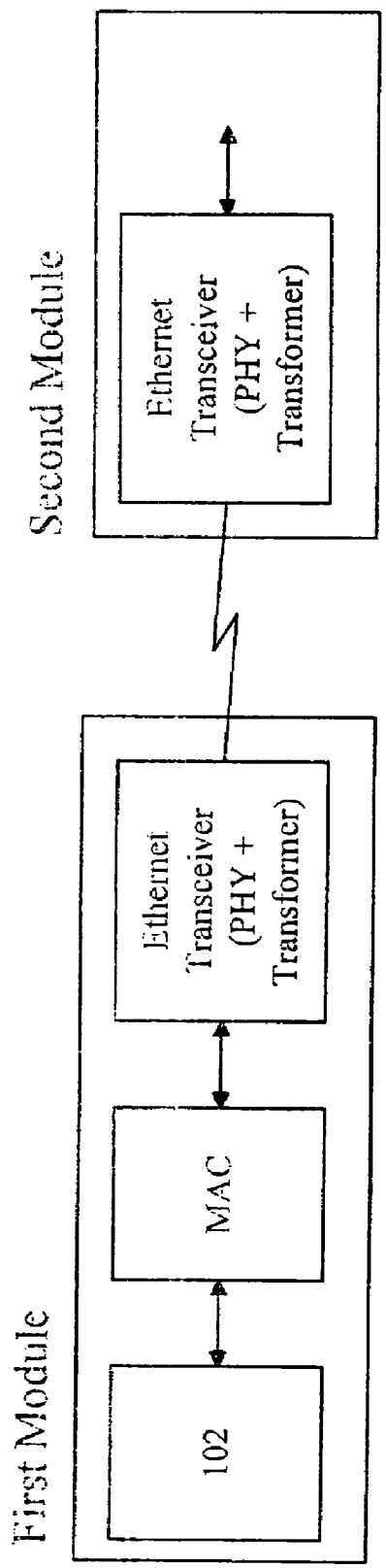
FIG. 4 illustrates a communication embodiment of transceiving data packets between first and second modules according to the present invention.

Please refer to FIG. 4, which illustrate a communication embodiment of transceiving data packets between first and second modules according to the present invention. Please also refer to FIG. 2 with FIG. 4. It shows the embodiment of employing aforesaid first Ethernet transceiver 106 and the second Ethernet transceiver 206 to transceive data packets between the first module 10 and the second module 20. Therefore, the first processor 102 needs to communicate with the second processor 202 of the second module 20 through a MAC (Media Access Control) address unit and the first Ethernet transceiver 106. The second processor 202 also needs to communicate with the first processor 102 through a MAC (Media Access Control) address unit (not shown) and the second Ethernet transceiver 206. However, the difference between RS485 UART and Ethernet transceiver is, the max baud rate of RS485 UART is not more than 1 M bps generally and that of Ethernet is 10 M bps.

Figure 5:
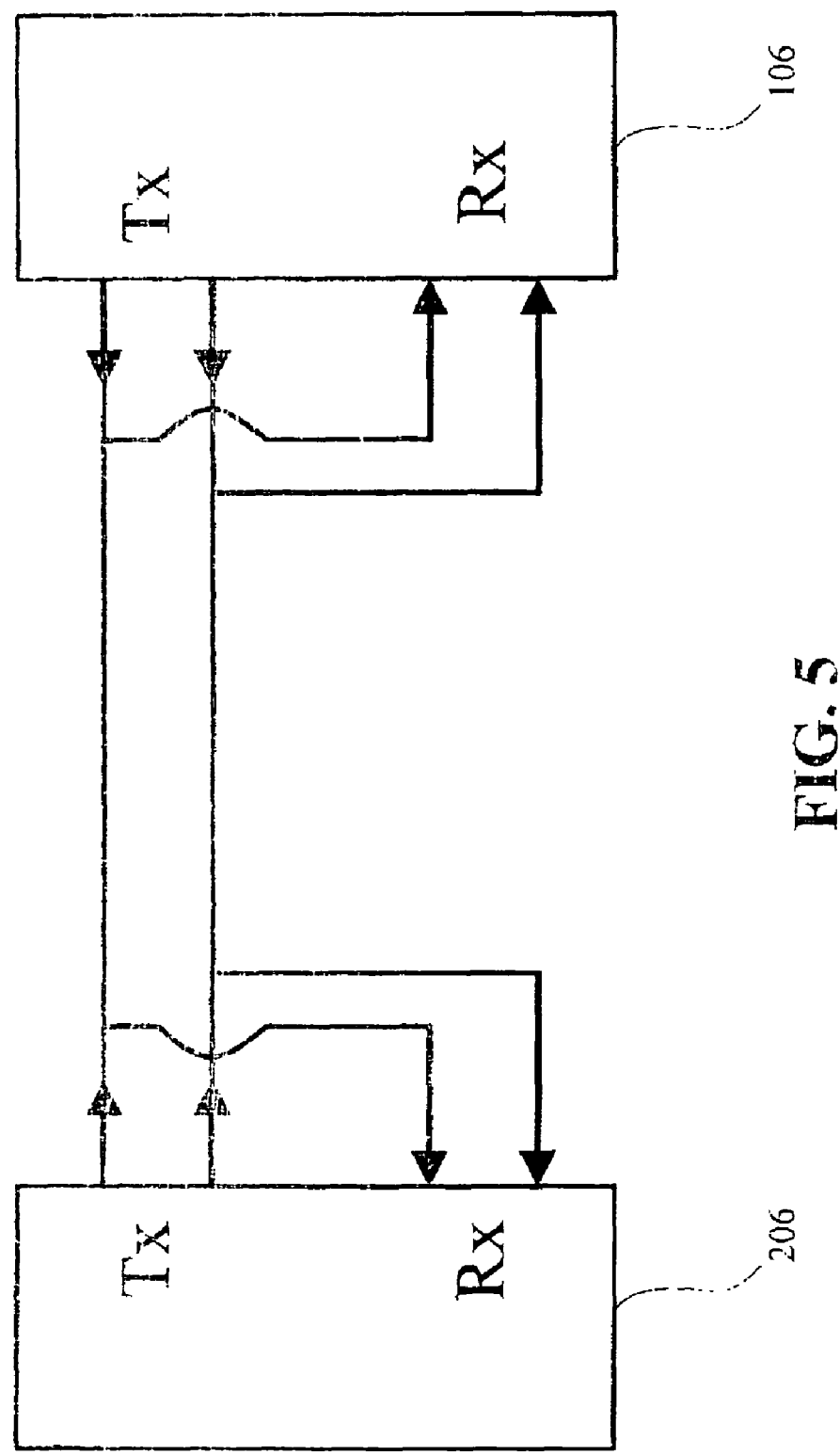
FIG. 5 illustrates a half duplex communication executed by two wires of the cable applied in the present invention.

Please refer to FIG. 5, which illustrates a half duplex communication executed by two wires of the cable applied in the present invention. In common skill of network interconnection, a full-duplex communication is employed for transceiving data packets. However, such full-duplex communication needs four wires to establish communication. In the present invention, for either the embodiments of Ethernet communication, a half duplex communication by only two wires is employed. The first Ethernet transceiver 106 and the second Ethernet transceiver 206 do not transmit data packets simultaneously. However, by employing half duplex communication, only two wires of the cable 110 are needed to transceive data packets. Accordingly, the other six wires are free for transmitting three components of the video signal from the computer to the console or the local console.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A keyboard-video-mouse (KVM) extender system, comprising:
    a first module configured to connect to a computer, comprising:
        a first processor, operable to transform first mass data into at least one first data packet, and operable to transform at least one second packet into second mass data;
        a first interface, operable to transceive the first mass data from a first USB mass storage to the first processor and operable to transceive the second mass data from the first processor to the first USB mass storage; and
        a first Ethernet transceiver, operable to transceive the second data packet from a cable to the first processor, and operable to transceive the first data packet from the first processor to the cable; and
    a second module configured to connect to a console, comprising:
        a second processor, operable to transform the second mass data into the second data packet, and operable to transform the first data packet into the first mass data;
        a second interface, operable to transceive the second mass data from a second USB mass storage to the second processor and transceiving operable to transceive the first mass data from the second processor to the second USB mass storage; and
        a second Ethernet transceiver, operable to transceive the second data packet from the second processor to the cable, and operable to transceive the first data packet from the cable to the second processor, wherein the first module is directly connected to the second module without network hubs disposed therebetween, wherein the first data packet and the second data packet transceived between the first Ethernet transceiver and the second Ethernet transceiver are controlled by a half duplex communication executed by two wires of the cable.

2. The KVM extender system of claim 1, wherein the first module further comprises a third interface, operable to transceive third mass data from a computer to the first processor, and operable to transceive the first mass data or the second mass data from the first processor to the computer, wherein the first interface is operable to transceive the third mass data from the first processor to the first mass storage.

3. The KVM extender system of claim 1, wherein the first module further comprises a third interface, operable to transceive third mass data from a computer to the first processor, and operable to transceive the first mass data or the second mass data from the first processor to the computer, wherein the first processor is operable to transform the third mass data into at least one third data packet, wherein the first Ethernet transceiver is operable to transceive the third data packet from the first processor to the cable, wherein the second Ethernet transceiver is operable to transceive the third data packet from the cable to the second processor, wherein the second processor is operable to transform the third data packet into the third mass data, wherein the second interface is operable to transceive the third mass data to the second USB mass storage.

4. The KVM extender system of claim 1, wherein the first module further comprises a differential circuit, operable to transmit a video signal to the second module and the second module further comprises a de-differential circuit, receiving the video signal from the first module.

5. The KVM extender system of claim 1, wherein the first module further comprises a first audio converter, operable to convert audio signal from the computer into audio data and the second module further comprises a second audio converter, operable to convert the audio data into the audio signal.

6. The KVM extender system of claim 5, wherein the first processor is operable to transform the audio data into the first data packet and the second processor is operable to transform the first data packet into the audio data.

7. The KVM extender system of claim 1, wherein the first module further a first microphone connector for receiving a first sound signal and the second module further comprises a second microphone connector for receiving a second sound signal, wherein a switch of the first module selects the first sound signal or the second sound signal inputted to the computer.

8. The KVM extender system of claim 7, wherein the second module further comprises a second audio converter, operable to convert the second sound signal into second sound data, wherein the second processor transforms the second sound data into the second data packet, the first processor transforms the second data packet into the second sound data, wherein the first module further comprises a first audio converter, operable to convert the second sound signal from the first processor into the second sound signal for the switch.

9. The KVM extender system of claim 1, wherein the second processor is operable to transform keyboard data and mouse data received from a console into the second data packet and the first processor is operable to transform the second data packet into the keyboard data and the mouse data to the computer.

10. A keyboard-video-mouse (KVM) extender system, comprising:
a first module configured to connect to a computer, comprising:
a first processor, operable to transform first mass data into at least one first data packet, operable to transform at least one second data packet into second mass data;
a first interface, operable to transceive the first mass data from a computer to the first processor and operable to transceive the second mass data from the first processor to the computer; and
a first Ethernet transceiver, operable to transceive the second data packet from a cable to the first processor, and operable to transceive the first data packet from the first processor to the cable; and
a second module configured to connect to a console, comprising:
a second processor, operable to transform the second mass data into the second data packet, and operable to transform the first data packet, into the first mass data;
a second interface, operable to transceive the second mass data from a first USB mass storage to the second processor and operable to transceive the first mass data from the second processor to the first USB mass storage; and
a second Ethernet transceiver, operable to transceive the second data packet from the second processor to the cable, and operable to transceive the first data packet from the cable to the second processor, wherein the first module is directly connected to the second module without network hubs disposed therebetween, wherein the first data packet and the second data packet transceived between the first Ethernet transceiver and the second Ethernet transceiver are controlled by a half duplex communication executed by two wires of the cable.

11. The KVM extender system of claim 10, wherein the first module further comprises a third interface, operable to transceive third mass data from a second USB mass storage to the first processor, operable to transceive the first mass data from the first processor to the second USB mass storage, wherein the first interface operable to transceive the third mass data from the first processor to the computer.

12. The KVM extender system of claim 10, wherein the first module further comprises a third interface, is operable to transceive third mass data from a second storage to the first processor, and is operable to transceive the second mass data from the first processor to the second USB mass storage, wherein the first processor is operable to transform the third mass data into at least one third data packet, wherein the first Ethernet transceiver is operable to transceive the third data packet from the first processor to the cable, wherein the second Ethernet transceiver is operable to transceive the third data packet from the cable to the second processor, wherein the second processor is operable to transform the third data packet into the third mass data, wherein the second interface is operable to transceive the third mass data to the first USB mass storage.

13. The KVM extender system of claim 10, wherein the first module further comprises a differential circuit, is operable to transmit a video signal to the second module and the second module further comprises a de-differential circuit is operable to receive the video signal from the first module.

14. The KVM extender system of claim 10, wherein the first module further comprises a first audio converter, operable to convert audio signal from the computer into audio data and the second module further comprises a second audio converter operable to convert the audio data into the audio signal.

15. The KVM extender system of claim 14, wherein the first processor is operable to transform the audio data into the first data packet and the second processor transforms the first data packet into the audio data.

16. The KVM extender system of claim 10, wherein the first module further comprises a first microphone connector for receiving a first sound signal and the second module further comprises a second microphone connector for receiving a second sound signal, wherein a switch of the first module selects the first sound signal or the second sound signal inputted to the computer.

17. The KVM extender system of claim 16, wherein the second module further comprises a second audio converter operable to convert the second sound signal into second sound data, wherein the second processor is operable to transform the second sound data into the second data packet, the first processor is operable to transform the second data packet into the second sound data, wherein the first module further comprises a first audio converter, operable to convert the second sound signal from the first processor into the second sound signal for the switch.

18. The KVM extender system of claim 10, wherein the second processor operable to transform keyboard data and mouse data received from a console into the second data packet and the first processor operable to transform the second data packet into the keyboard data and the mouse data to the computer.

19. A keyboard-video-mouse (KVM) extender system, comprising:
a first module configured to connect to a computer comprising:
a first processor, operable to transform mass data into a data packet;
a first interface, operable to transceive the mass data to the first processor; and
a first Ethernet transceiver, operable to transceive the data packet from the first processor to the cable; and
a second module configured to connect to a console, comprising:
a second processor, operable to transform the data packet into the mass data;
a second interface, operable to transceive the mass data from a USB mass storage to the second processor; and
a second Ethernet transceiver, operable to transceive the data packet from the cable to the second processor, wherein the first module is directly connected to the second module without network hubs disposed therebetween, wherein the data packet transceived between the first Ethernet transceiver and the second Ethernet transceiver are controlled by a half duplex communication executed by two wires of the cable.

20. A keyboard-video-mouse (KVM) extender system, comprising:
 a first module having a first interface configured to connect to a computer; and
 a second module connected to the first module through a cable, the second module having a second interface configured to connect to a console, wherein the first module further comprises:
  a first processor; and
  a first Ethernet transceiver operable to transceive at least one data packet from the second module to the first processor and the first processor then operable to transform the at least one data packet into mass data and transmit the mass data to the computer coupled to the first module;
 wherein the second module further comprises:
  a second processor operable to transform the mass data received from a USB mass storage coupled to the second interface of the second module into the at least one data packet, and
  a second Ethernet transceiver operable to transceive the data packet from the second processor to the cable and further to the first module.

21. The KVM extender system of claim 20, wherein two wires of the cable are operable to control the data packet transmitted between the first Ethernet transceiver and the second Ethernet transceiver by a half duplex communication.

\* \* \* \* \*